United States Patent [19]
Tsai

[11] Patent Number: 5,379,115
[45] Date of Patent: Jan. 3, 1995

[54] DIFFERENTIAL INTERFEROMETER

[75] Inventor: John C. Tsai, Saratoga, Calif.

[73] Assignee: Excel Precision, Santa Clara, Calif.

[21] Appl. No.: 647,735

[22] Filed: Jan. 28, 1991

[51] Int. Cl.$^6$ ............................................. G01B 11/02
[52] U.S. Cl. .................................... 356/351; 356/349;
356/358; 356/363
[58] Field of Search ................. 356/349, 351, 358, 363

[56] References Cited

U.S. PATENT DOCUMENTS

| 4,802,765 | 2/1989 | Young et al. | 356/351 |
| 4,859,066 | 8/1989 | Sommargren | 356/351 |

Primary Examiner—Davis L. Willis
Assistant Examiner—LaCharles Keesee
Attorney, Agent, or Firm—Michael J. Hughes

[57] ABSTRACT

What is disclosed is an improved high resolution laser interferometer (10) which gains an increase accuracy through elimination of a source of temperature change error by causing a reference laser beam (16) to traverse the same distance within glass as does a measurement laser beam (18). The inventive arrangement of optics combines a polarizing cube (24), a cube corner retroreflector (28), a right angle reflector (30), and two or more quarter wave plates (32), (34) and (36)to produce the desired result. An equally preferred alternate embodiment (210) of the invention combines the first preferred embodiment (10) with an etalon (240) to directly measure the refractive index of air. This measurement is then used to adjust readings obtained using the first preferred embodiment (10) to further improve accuracy.

13 Claims, 2 Drawing Sheets

DIFFERENTIAL INTERFEROMETER

TECHNICAL FIELD

The present invention relates generally to the use of lasers to detect and measure movement, and more particularly to an improvement which reduces the effects of potential error sources associated with the use of a laser interferometer. The predominant current usage of the improved laser interferometer of the present invention is in the precise measurement of relative movement, and thus of relative displacement, in scientific research and in applications requiring extreme measurement precision such as the manufacture of integrated circuits.

BACKGROUND ART

Interferometry has become a well known means for the accurate measurement of distance. Both electronic and optical means for increasing the resolution and accuracy of laser interferometers have contributed to advancements in the field until an accuracy of less than one part in ten million has been attained. However, as the resolution and accuracy of laser interferometers has been improved, consideration of certain error sources which are inherent to such devices has increased in importance. Temperature change errors, dead path errors, and errors due to the variable index of refraction of the air through which the laser beam must pass once represented only a small fraction of the available resolution. However, given the increased resolution of modern laser interferometers, which is in the range of a few nanometers, these error factors represent significant inaccuracies.

Laser interferometers commonly use an electronic apparatus for detecting and analyzing fringes created by phase differences between a measurement laser beam and a reference laser beam, and thus for detecting and analyzing indications of movements resulting in changes in length of a path traveled by the measurement laser beam. Temperature change errors result from the fact that the dimensions of optical components through which the laser beams must pass are altered slightly by variations in temperature. In prior art arrangements of interferometer components the reference beam path travels through a different length of glass within the interferometer as compared to that length of glass traveled by the measurement beam. Since the speed of propagation of the laser beams within the glass is different from that within the surrounding air, the reference and measurement beams are affected differently by the expansion and contraction of the glass components, thus causing some error.

Dead path errors result from differences between the path of the reference beam as compared to that of the measurement beam in that portion of those beams which preceeds the actual measurement portion of the beams, including those portions of the paths lying outside the glass optical components.

The index of refraction of air is dependent upon temperature and other physical variables and also upon the instant composition of the air, particularly the $CO_2$ content. To the extent that the measurement beam is affected differentially by a change in the index of refraction of the air through which it travels, such changes in the air refractive index produces a false indication of a change of the length of the measurement beam path.

Given the increasing demand for increased resolution and increased accuracy of laser interferometers, clearly a means for eliminating or minimizing temperature change error, dead path error and/or variable air refractive index error would be desirable. Various means have been tried in the field to accomplish these goals. For example, it has been recognized that errors can be minimized by providing, as nearly as is possible, identical paths for the reference laser beam and the measurement laser beam. However, no satisfactory means has been found for accomplishing this goal. Further, it is now a well known practice to compensate mathematically for the variable index of refraction of the air. However, this practice is limited by the fact that no practical means has been found for quickly and accurately measuring the air refractive index in the environment using equipment which can also ultimately be used for taking the desired measurement.

It would be most desirable to provide equal length optical paths within the glass portions of the interferometer and further to minimize any differences between the paths of the two beams through the air. However, previous attempts to produce such a means have been less than successful. Also, it would be even more beneficial if the index of refraction of the air could be accurately measured in real time in order to compensate therefor.

All of the prior art interferometers within the inventor's knowledge have either incorporated optics in which the reference laser beam passed through an unequal length of glass as compared to the measurement laser beam and/or considerable differences has existed between the length of the paths of the two beams outside the glass portion of the optics.

No prior art interferometer to the inventor's knowledge has successfully provided a means for essentially eliminating temperature change error while reducing dead path error. Nor has any prior art interferometer to the inventor's knowledge successfully provided a means for using a measurement interferometer to also directly measure the prevalent index of refraction of the ambient air. All successful laser interferometer optics to date have suffered from excessive temperature change error and/or excessive dead path error and/or excessive error caused by the variable index of refraction of the ambient air.

DISCLOSURE OF INVENTION

Accordingly, it is an object of the present invention to provide a means to effectively eliminate temperature change error within interferometer glass components.

It is another object of the present invention to provide a means for minimizing dead path error in a laser interferometer.

It is a further object of the present invention to provide a means to directly measure the index of refraction of air using a laser interferometer.

It is yet another object of the present invention to provide a means for increasing the overall accuracy of laser interferometers.

It is still another object of the present invention to provide a means for increasing the accuracy of laser interferometers which is inexpensive to manufacture.

It is yet another object of the present invention to provide a means for increasing the accuracy of laser interferometers which is reliable in operation.

It is still another object of the present invention to provide a means for directly measuring the index of refraction of air which can utilize the same laser interferometer which is to be used in taking a measurement.

It is yet another object of the present invention to provide a means for measuring distances with great accuracy using conventional interferometer laser emitting devices and electronic analyzing devices.

It is still another object of the present invention to provide a laser interferometer for measuring the variable index of refraction of air in which all phase shifts between a measurement laser beam and a reference laser beam are attributable to such variable.

Briefly, the preferred embodiment of the present invention is a plane mirror interferometer employing a unique arrangement of a polarizing cube, a cube corner retroreflector, a right angle reflector, three quarter wave plates and a reference beam reflector to direct a measurement laser beam and a reference laser beam such that the reference laser beam traverses the same length of glass as does the reference laser beam, and further such that any difference between the length of the path traveled by the reference laser beam and that traveled by the measurement laser beam is minimized. This arrangement greatly reduces temperature change error and also minimizes dead path error. An equally preferred alternate embodiment of the invention uses essentially the same arrangement of components as does the first preferred embodiment except that the object mirror and the reference beam reflector are both replaced with an etalon in such a manner that differences in propagation time between the measurement laser beam and the reference laser beam are directly indicative of the index of refraction of the ambient air. This provides a direct means of measurement of the ambient air refractive index which, when known, can be used as a compensating factor, by known methods, to improved the accuracy of the laser interferometer.

An advantage of the present invention is that distances may be determined to a great degree of accuracy.

A further advantage of the present invention is that it may be used with conventional laser emitting and analyzing devices.

Still another advantage of the present invention is that it is easy and inexpensive to manufacture.

Yet another advantage of the present invention is that temperature change errors are reduced.

Still another advantage of the present invention is that dead path errors are reduced.

Yet another advantage of the present invention is that the air refractive index can be directly measured thus providing data needed to compensate for and eliminate any errors potentially caused thereby.

Still another advantage of the present invention is that, when used to measure the variable index of refraction of air, all phase shifts occurring between the reference laser beam and the measurement laser beam are attributable to that variable.

These and other objects and advantages of the present invention will become clear to those skilled in the art in view of the description of the best presently known mode of carrying out the invention and the industrial applicability of the preferred embodiments as described herein and as illustrated in the drawing.

BEST MODE FOR CARRYING OUT INVENTION

The best presently known mode for carrying out the invention is a laser interferometer having a unique combination of optical components for causing a reference laser beam to travel a distance within glass equal to that distance within glass traveled by a measurement laser beam, and further for increasing an overall distance traveled by the reference laser beam to approximate the overall distance traveled by the measurement laser beam. The predominant expected usage of the inventive improved laser interferometer is in the microchip manufacturing industry, particularly in the control of wafer stepper apparatus wherein extremely high positioning accuracy is desirable.

Figure 1:
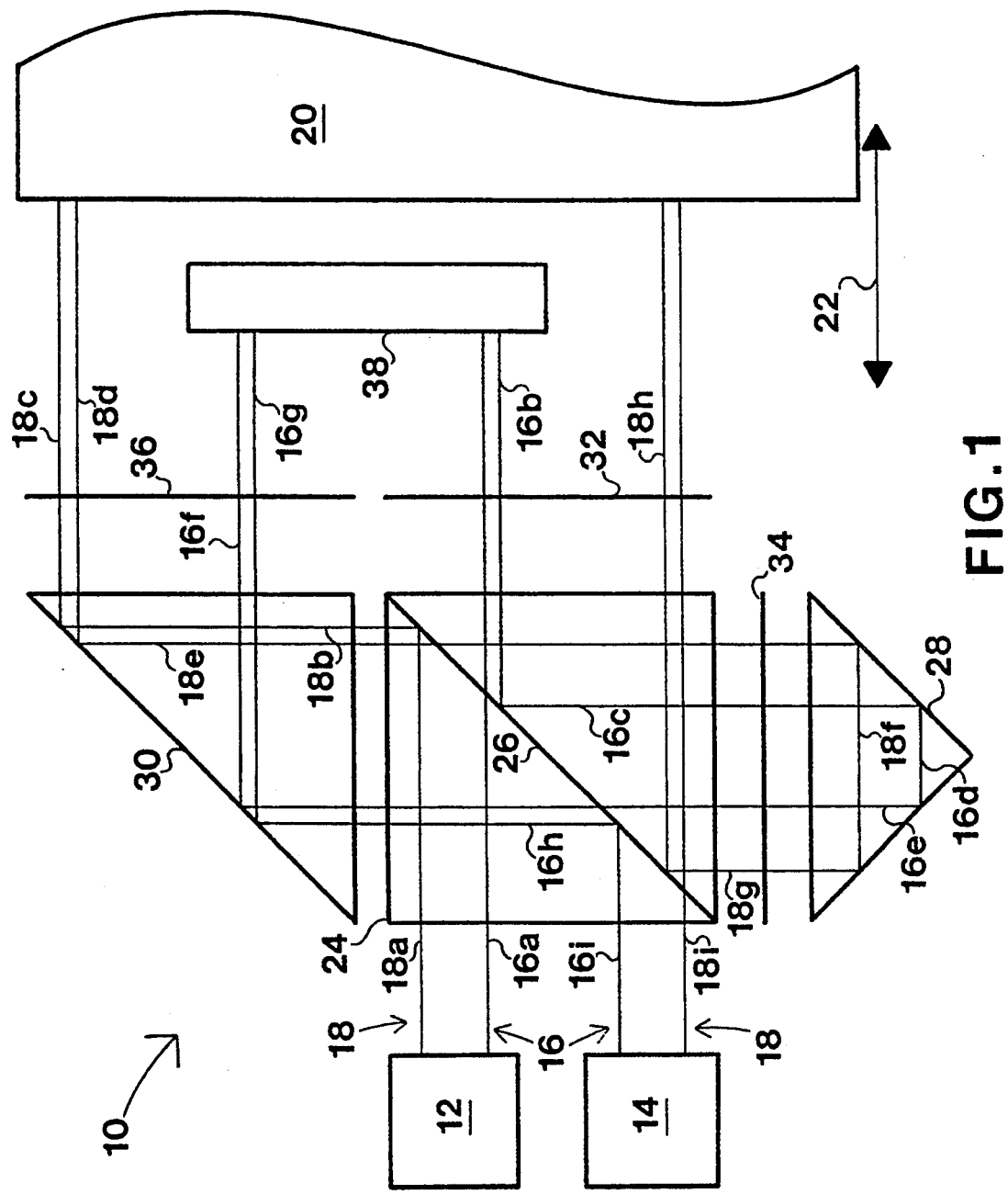
FIG. 1 is a two dimensional diagram of a differential interferometer, according to the present invention.

The differential laser interferometer of the presently preferred embodiment of the present invention is illustrated in a side view two dimensional diagram in FIG. 1 and is designated therein by the general reference character 10. It should be noted that two dimensional diagrams such as FIG. 1 are commonly used in the field to depict optical paths. One skilled in the art will recognize that, although displacement between paths must be shown in such diagrams in the two available dimensions, such displacement may in fact occur in the third physical dimension in the actual embodiment of the device.

In many of its substantial components, the differential interferometer 10 does not differ significantly from conventional laser interferometers. The physical structure is similar to that of prior art plane mirror laser interferometers. The conventional elements of the high resolution interferometer 10 include a laser head 12 and a signal analysis unit 14. In the best presently known embodiment 10 of the invention, the laser head 12 is a frequency stabilized Helium-Neon Zeeman type laser which produces a reference laser beam 16 and a measurement laser beam 18, and the signal analysis unit 14 is a conventional means for comparing the reference laser beam 16 and the measurement laser beam 18 as received at the signal analysis unit 14 to determine phase shift which occurs during relative changes in the length the paths of either of the two beams and 18. It should be recognized that, although in actual practice, the laser beams 16 and 18 do, of course, have a cross sectional dimension, the inventive principle is here best illustrated by depicting the laser beams as one dimensional lines.

It should be noted that, in actual practice either the reference laser beam 16 or the measurement laser beam 18 may be used as a measurement beam, depending upon the nature of the measurement to be made and other circumstantial conditions. Although the laser beams 16 and 18 be may be interchanged in the actual practice of the best presently known embodiment 10 of the invention, the arrangement discussed herein is illustrative of the inventive principles.

A plane objective mirror 20 is the movable object the relative speed and distance of which, a measurement plane 22, are to be determined. The plane objective mirror 20 may be mounted on a movable stage (not shown) or a movable portion of a machine to be controlled by means of feedback from the high resolution interferometer 10.

Additional components of the best presently known embodiment 10 of the inventive high resolution interferometer are a polarizing cube 24 having a polarizing surface 26 situated diagonally within, a cube corner retroreflector 28, a right angle reflector 30, a first quarter wave plate 32, a second quarter wave plate 34 and a third quarter wave plate 36.

As can be seen in the drawing, a first reference segment 16a of the reference beam 16 is directed to the polarizing surface 26, where it passes through unaffected. This occurs because the first reference segment 16a is linearly polarized as it leaves the laser head 12 such that it will pass through the polarizing surface 26 and will not be reflected therefrom. The first reference segment 16a continues through the first quarter wave plate 32 and is reflected from a reference beam mirror 38 as a second reference beam segment 16b.

The quarter wave plates 32, 34 and 36 are well known components in the field. The effect of the passing of any linearly polarized laser beam twice through the quarter wave plates (once in each direction, in this case) is to rotate the plane of polarization of the beam by ninety degrees. Thus, the effect of passing the first reference segment 16a and the second reference segment 16b through the first quarter wave plate 32 is to rotate the reference laser beam 16 such that the second reference segment 16b will not pass through the polarizing surface 26 and is reflected therefrom. It should be noted that, for illustrative purposes, the second reference segment 16b is shown slightly displaced from the first reference segment 16a in the plane of the paper in the drawing of FIG. 1, as are all laser beams which may be reflected straight back, herein.

A third reference segment 16c is that portion of the reference beam 16 which is reflected from the polarizing surface 26 through the second quarter wave plate 34 and toward the cube corner 28. A fourth reference beam segment 16d is that portion of the reference beam 16 which is directed across the interior of the cube corner 28. It should be noted that the cube corner 28 is a well known and widely practiced component, and the intricacies of a path of reflection taken by a laser beam within the cube corner 28 is entirely within the knowledge of one skilled in the art and will not be discussed in detail herein.

A fifth reference segment 16e is that portion of the reference laser beam 16 which is reflected back from the cube corner 28 and again through the second quarter wave plate 34 to the polarizing surface 26. Since the reference laser beam 16 is once again rotated in polarization by having been passed twice through the second quarter wave plate 34 within the interferometer 10, the fifth reference segment 16e passes through the polarizing surface 26 and into the right angle reflector 30.

A sixth reference beam segment 16f is that portion of the reference laser beam 16 which is reflected from the right angle reflector 30 through the third quarter wave plate 36 and again onto the reference beam mirror 38, and a seventh reference beam segment 16g is that portion of the reference laser beam 16 which is again reflected back from the reference beam mirror 38 and again passes through the third quarter wave plate 36 thereby yet again accomplishing a ninety degree rotation of polarization of the reference laser beam 16 at that point.

The seventh reference beam segment 16g is again reflected by the right angle reflector 30 as shown in the drawing of FIG. 1, this time toward the polarizing surface 26 as an eighth reference beam segment 16h. The eighth reference beam segment 16h is then reflected into the signal analysis unit 14 as a ninth reference beam segment 16i.

As can be seen in the drawing, a first measurement beam segment 18a is that portion of the measurement laser beam 18 emitted from the laser head 12. The first measurement beam segment 18a is linearly polarized in a plane orthogonal to that of the first reference segment 16a such that the first measurement beam segment 18a will be reflected from the polarizing surface 26 rather than passing through. The first measurement beam segment 18a is reflected from the polarizing surface 26 as a second measurement beam segment 18b into the right angle reflector, from which it is reflected as a third measurement beam segment 18c.

The third measurement beam segment 18c passes through the third quarter wave plate 36 and is reflected back from the plane objective mirror 20 and again through the third quarter wave plate 36 as a fourth measurement beam segment 18d. The fourth measurement beam segment 18d is directed by the right angle reflector 30 toward the polarizing surface 26 as a fifth measurement beam segment 18e. For the reasons explained previously herein, the fifth measurement beam segment 18e passes through the polarizing surface 26 through the second quarter wave plate 34 and into the cube corner retroreflector 28.

A sixth measurement beam segment 18f is that portion of the measurement laser beam 18 which passes across the interior of the cube corner retroreflector 28. A seventh measurement beam segment 18g is reflected from the cube corner retroreflector 28 and through the second quarter wave plate 34. Since the fifth measurement beam segment 18e and the seventh measurement beam segment 18g both pass through the second quarter wave plate, polarization of the seventh measurement beam segment 18g is rotated such that it is reflected from the polarizing surface as an eighth measurement beam segment 18h. The eighth measurement beam segment 18h passes through the first quarter wave plate 32 and is reflected from the plane objective mirror 20 as a ninth measurement beam segment 18i. Finally, the ninth measurement beam segment returns through the first quarter wave plate, which completes yet another ninety degree rotation of the measurement laser beam 18 such that the ninth measurement beam segment passes through the polarizing surface 26 and into the signal analysis unit 14.

As previously discussed, the signal analysis unit 14 receives and compares the reference laser beam 16 and the measurement laser beam 18 to determine the speed of the moving plane objective mirror 20 in the measurement plane 22 and, by integrating over a time period, the displacement of the plane objective mirror 20 and any apparatus to which it is fixed. Of course, the block representation of the signal analysis unit 14 in the drawing is merely representative of the actual physical device which, in actual practice, consists of a receiving portion (not shown) and a separate electronic signal analysis portion (not shown). The signal analysis unit 14 is a conventional apparatus which is not unique to the present invention.

A careful analysis of the differential laser interferometer 10 as heretofore disclosed will reveal that the sum of distances traveled by the measurement laser beam 18 and the reference laser beam 16 within the polarizing cube 24, the cube corner retroreflector 28 and the right angle reflector 30 are identical. The polarizing cube 24, the cube corner retroreflector 28 and the right angle reflector 30 are constructed of glass and are subject to expansion and contraction due to changes in temperature. Thus, by keeping the paths of the reference laser beam 16 and the measurement laser beam 18 identical within these components, temperature change error is virtually eliminated, at least as to the major source of such error. Furthermore, it should be noted that the reference beam mirror 38 can be made quite thin and positioned relatively close to the plane objective mirror 20, thereby eliminating most dead path error from the system.

Figure 2:
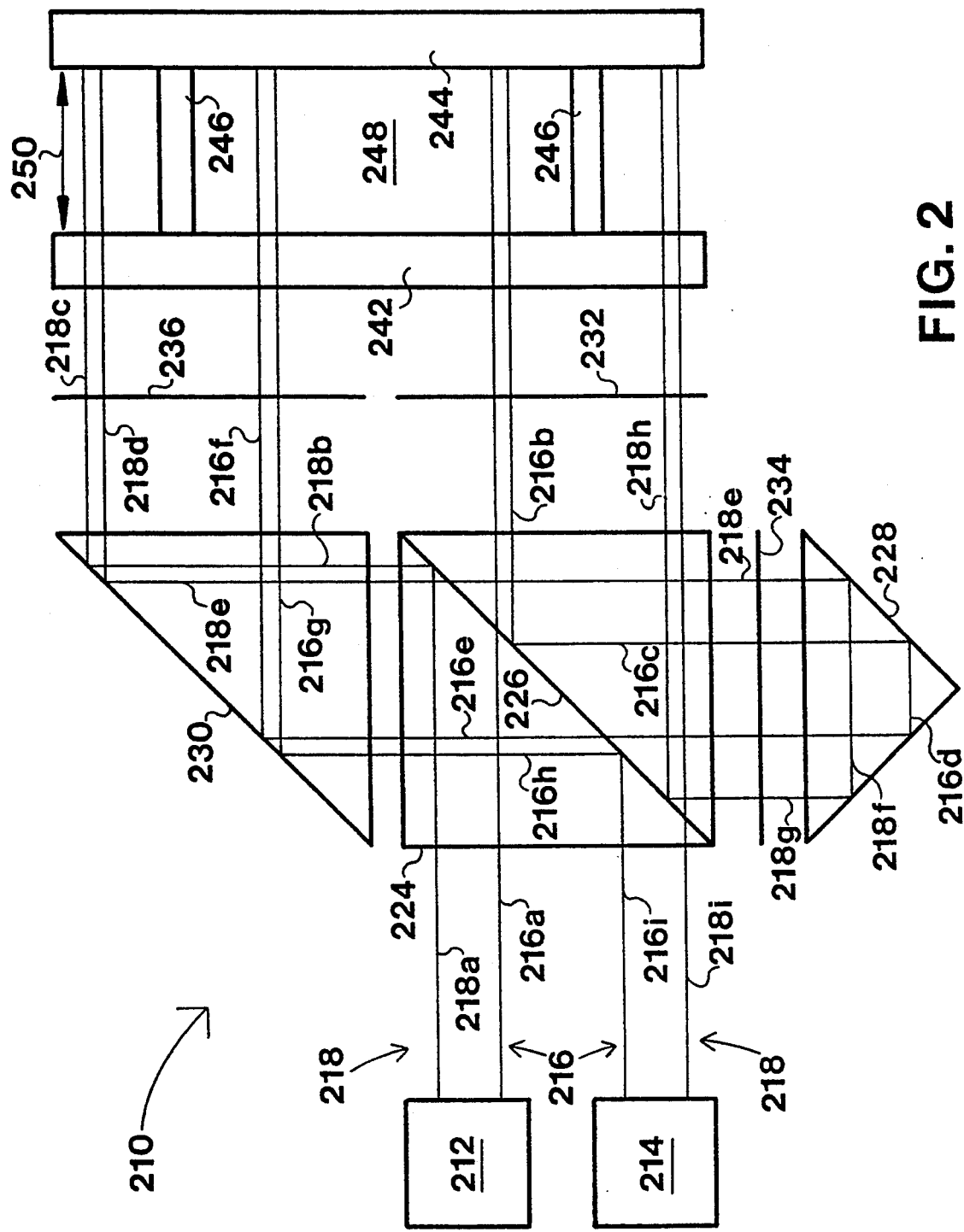
FIG. 2 is a two dimensional diagram of an absolute interferometer, according to the present invention.

An equally preferred alternate embodiment of the invention is depicted in FIG. 2 and is designated therein by the general reference character 210. The absolute laser interferometer 210 is an adaption of the differential laser interferometer 10 (FIG. 1) for measuring the index of refraction of ambient air. The absolute interferometer 210 is similar to the differential interferometer 10, having an identically arranged and functioning laser head 212, signal analysis unit 214, reference laser beam 216, measurement laser beam 218, polarizing cube 224 with a polarizing surface 226, cube corner retroreflector 228, right angle reflector 230, first quarter wave plate 232, second quarter wave plate 234 and third quarter wave plate 236. The absolute interferometer 210 differs from the differential interferometer 10 primarily in that an etalon 240 is substituted for the plane objective mirror 20 (FIG. 1) and the reference beam mirror 38 (FIG. 1). The etalon 240 is a well known component used in conjunction with interferometers for taking certain measurements including measuring the index of refraction of air. The particular etalon 240 of the present invention has a transparent plate 242, a reflective plate 244 and a separating tube 246. It should be noted that the diagram of FIG. 2 is schematic in nature and that, in the actual physical embodiment of the invention, the combination of the separating tube 246, the transparent plate 242 and the reflective plate 244 completely encloses an interior chamber 248. In the presently preferred alternate embodiment 210 of the invention, the etalon 240 is constructed using a squat tubular separating tube 246 although alternate shapes for the separating tube 246 would work equally well provided that such shape could be machined with sufficient precision to allow evacuation of the interior chamber 248. The etalon 240 of the present invention has the separating tube 246 capped at its two open ends by the transparent plate 242 and the reflective plate 244. The interior chamber 248 is evacuated and the etalon 240 is held together by that vacuum.

As can be seen in the drawing of FIG. 2, The path followed by a first through a ninth reference laser beam segments 216a through 216i are essentially the same as heretofore described in conjunction with the first presently preferred embodiment 10 of the invention, with the exception that the first reference segment 216a is directed through the transparent plate 242 of the etalon 240 and is reflected from the reflective plate 244 as the second reference beam segment 216b. Also, the sixth reference segment 216f is directed through the transparent plate 242 of the etalon 240 and is reflected from the reflective plate 244 as the seventh reference beam segment 216g, whereas in the first preferred embodiment 10 of the invention, the fist and sixth reference beam segments 16a and 16f were intercepted by and reflected from the reference beam mirror 38 (FIG. 1). In like fashion, in the equally preferred alternate embodiment 210 of the invention, the paths of a first through a ninth measurement beam segment 218a through 218i are similar to that of corresponding segments in the first preferred embodiment 10 except that the third and eighth measurement beam segments 218c and 218h are passed through the transparent plate 242 and reflected from the reflective plate 244 as the fourth measurement beam segment 218d and the ninth measurement bear segment 218i respectively.

As heretofore described, and as can be seen in the drawing of FIG. 2, the reference laser beam 216 and the measurement beam 218 travel identical distances, both through glass (as explained in conjunction with the description of the first preferred embodiment 10 of the invention) and through air, with the single exception of those portions traveling through a comparison span 250 which is the distance between the transparent plate 242 and the reflective plate 244. As can be seen in the drawing of FIG. 2, within the comparison span 250, the reference laser beam 216 travels through the evacuated interior chamber 248, while the measurement beam 218 is traveling through ambient air. Since any phase differences between the reference laser beam 216 and the measurement laser beam 218 appearing at the signal analysis unit 214 are attributable only to difference between the index of refraction of the ambient air and as compared to the vacuum within the interior chamber 248 such phase difference provide a direct indication of the refractive properties of the ambient air, which can be reduced to an absolute refractive index figure when adjusted for the length of the comparison span 250.

While, as has been previously disclosed, etalons have been used in the past to attempt to measure the refractive index of gasses, it is only in combination with the first presently preferred embodiment 10 of the invention that the etalon 240 provides for an indication which is directly correlative of the refractive index. This is so because prior art methods have not had the benefit of the inventive apparatus for eliminating other sources of variation between the reference laser beam 216 and the measurement laser beam 218. Thus, in the second equally preferred embodiment 210 of the invention, the fact that the two laser beams 216 and 218 travel identical distances through glass provides the this benefit in addition to that previously identified, that being the elimination of temperature change errors.

As is shown above, in great part, the differential laser interferometer 10 and the absolute laser interferometer 210 according to the present invention closely resemble prior art conventional plane objective mirror interferometers in many respects. The substantial difference exists in the inclusion of the unique inventive arrangement of reflectors and quarter wave plates to make the paths of the reference laser beams 16 and 216 as similar as possible to that of the measurement laser beams 18 and 218 (except where they are intentionally made different within the etalon 240). No significant changes of materials are envisioned nor are any special constructions required.

Various modifications may be made to the invention without altering its value or scope. For example, the inventive interferometers could be practiced using laser heads other than the Helium Neon laser head described herein, and with either a dual or single frequency laser.

Another conceivable change is that the arrangement of components might be reversed to create a mirror image of the inventive arrangement, or altered to cause the laser beams to be reflected in three dimensions. Similarly, the function of the reference laser beams 16 and 216 could be switch with that of the measurement laser beams 18 and 218 with only minor modifications to the arrangement of components.

Since the inventive arrangement of optical components is also independent of the type of signal reception and analysis devices and circuitry used, the present invention could be practiced with any existing or future type of laser transmission, reception, or analysis devices.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The laser interferometer is widely used in the field of metrology. The predominant current usages are for the measurement of very small distances, particularly in the production of microcircuit devices and in the field of scientific investigation.

The improved laser interferometers of the present invention may be utilized in any application wherein conventional laser interferometers are used. The main area of improvement is in the increased resolution due to the multiplication of measurement laser beam passes.

The improved laser interferometers of the present invention are used in conjunction with any available laser head devices and signal processing devices in use with conventional laser interferometers. It is anticipated that the increased accuracy provided by the inventive arrangement of interferometer optics will be readily accepted both in the field of metrology and in the manufacturing sector, particularly in the control of wafer stepper apparatus in the microchip manufacturing industry. In that application, the plane objective mirror 20 is mounted to a movable stage portion of a wafer stepper apparatus, and the signal analysis unit 14 is electrically connected to controlling circuitry of the wafer stepper apparatus. This arrangement is conventional in the field, and is not altered by application of the present invention.

It is anticipated that the first preferred embodiment 10 of the invention and the equally preferred alternate embodiment 210 might be combined such that the absolute interferometer 210 might be used to obtain a reading of the prevalent air refractive index, which reading will then be used to adjust for measurement readings taken using the differential interferometer 10, thereby further increasing the accuracy of the differential interferometer 10.

Since the improved laser interferometers of the present invention may be readily constructed and are physically significantly similar to prior art conventional laser interferometers it is expected that they will be acceptable in the industry as substitutes for the conventional plane objective mirror laser interferometer devices. For these and other reasons, it is expected that the utility and industrial applicability of the invention will be both significant in scope and long-lasting in duration.

I claim:

1. An improved interferometer, comprising:
    a columnated electromagnetic beam producing means for producing a linearly polarized measurement beam and further for producing a reference beam polarized orthogonally in relation to the initial polarization of the measurement laser beam;
    a signal analysis apparatus for comparing the measurement beam to the reference beam;
    a beam redirecting means for causing the measurement beam to be directed twice toward an objective mirror and then into the signal analysis apparatus and further for causing the reference beam to be directed twice toward a reference mirror and then into the signal analysis apparatus, wherein those portions of the reference beam which are between the beam redirecting means and the reference mirror are parallel to those portions of the measurement beam which are between the beam redirecting means and the objective mirror, wherein;
    the beam redirecting means includes a polarizing cube with a polarizing surface therein, a right angle reflector, a cube corner retroreflector and a plurality of beam polarity rotating means;
    said polarizing cube is located between the beam producing means and the reference mirror with said polarizing surface positioned such that the measurement laser beam is initially reflected from said polarizing surface into the right angle reflector and the reference laser beam initially passes through the polarizing surface and then is reflected from the reference mirror;
    said right angle reflector is positioned such that when the reference beam and the measurement beam are directed thereinto from the polarizing cube, the reference beam is redirected toward the reference mirror and the measurement beam is redirected toward the objective mirror;
    said cube corner retroreflector is positioned in relation the polarizing cube opposed to the right angle reflector such that when the measurement laser beam is directed into the polarizing cube from the right angle reflector with polarization such that the measurement laser beam passes through the polarizing surface the measurement laser beam passes into the cube corner retroreflector and is redirected back toward the polarizing cube; and
    said beam polarity rotating means are positioned;
        between said polarizing cube and said objective mirror, such that polarity of the measurement beam is rotated by ninety degrees during each completed circuit of the measurement beam between said polarizing cube and said objective mirror;
        between said polarizing cube and said reference mirror, such that polarity of the reference beam is rotated by ninety degrees during each completed circuit of the reference beam between said polarizing cube and said reference mirror;
        between said right angle reflector and said objective mirror, such that polarity of the measurement beam is rotated by ninety degrees during each complete circuit of the measurement beam between said right angle reflector and said objective mirror;
        between said right angle reflector and said reference mirror, such that polarity of the reference beam is rotated by ninety degrees during each completed circuit of the reference beam between said right angle reflector and said reference mirror; and
        between said cube corner retroreflector and said polarizing cube, such that polarity of the measurement beam is rotated by ninety degrees during each completed circuit between said polarizing cube and said cube corner retroreflector, and further such that polarity of the reference beam is rotated by ninety degrees during each completed circuit between said polarizing cube and said cube corner retroreflector.

2. The improved interferometer of claim 1, wherein: said objective mirror and said reference mirror are both portions of a mirrored surface of an etalon and further wherein the reference beam is directed through a vacuum chamber to and from said mirrored surface of said etalon while the measurement beam is directed outside said vacuum chamber of said etalon to said mirrored surface.

3. The improved interferometer of claim 1, wherein: said objective mirror is movable such that overall length of the measurement beam can be altered by movement of said objective mirror, and further wherein said reference mirror is positioned in a fixed location relative to the beam redirecting means and between the beam redirecting means and said objective mirror such that overall length of the reference beam remains constant during operation of the interferometer.

4. The improved interferometer of claim 3, wherein: said reference mirror is positioned in close proximity to said objective mirror such that overall length of the reference beam is approximately equal to overall length of the measurement beam.

5. The improved interferometer of claim 2, wherein: the beam polarity rotating means includes one or more quarter wave plates.

6. The improved interferometer of claim 1, wherein: the beam producing means is a Helium-Neon Zeeman type laser.

7. The improved interferometer of claim 1, wherein: the signal analysis apparatus is a conventional means for combining the reference laser beam and the measurement laser beam and for detecting optical interference fringes produced thereby.

8. An optical component for a laser interferometer, wherein:
a measurement beam is directed from a beam producing apparatus, to a polarizing surface, to a right angle reflector, through a first beam polarity altering means, to an objective mirror, again through said first beam polarity altering means, to said right angle reflector, [illegible] polarizing surface, [illegible] altering means, [illegible] again through [illegible] means, to said [illegible] beam polarity mirror, again [illegible] altering means, [illegible] into a fringe [illegible] beam producing surface, [illegible] means, to third beam [illegible] ing surface, [illegible] ing means, in through [illegible], through reflector, means, to first beam polarity altering means, to said polarizing surface and into said fringe detection and analysis apparatus.

9. The optical component of claim 8, wherein: said first beam polarity altering means, said second beam polarity altering means and said third beam polarity altering means cause polarization of the measurement light beam and the reference light beam to be rotated at by ninety degrees upon being passed twice therethrough.

10. The optical component of claim 8, wherein: said first beam polarity altering means, said second beam polarity altering means and said third beam polarity altering means are quarter wave plates.

11. The optical component of claim 8, wherein: said polarizing surface is contained within a polarizing cube;
said polarizing cube, said right angle reflector, and said cube corner retroreflector are optical glass components; and
the measurement beam and the reference beam travel equal distances through glass within said optical component.

12. An interferometer, including:
a beam emitting device for projecting a first polarized beam and a second polarized beam parallel to each other and further parallel to a measurement plane;
a polarizing cube positioned in the path of said polarized beams, the polarizing cube having therein a polarizing surface positioned such that when either of said beams is directed toward the polarizing surface parallel to said measurement plane it is redirected orthogonally to said measurement plane;
a right angle reflector positioned such that, when either of said beams is directed from the beam emitting device into the polarizing cube and then is redirected orthogonally to said measurement plane, said beam is redirected into the right angle reflector and is redirected therein to be again generally away from the beam emitting device and parallel to said measurement plane; and
a cube corner retroreflector positioned such that, when either of said beams is directed generally toward the beam emitting device parallel to said measurement plane and into the polarizing cube, and then is redirected orthogonally to said measurement plane, said beam is redirected into the cube corner retroreflector and then is redirected therein back toward the polarizing cube; wherein
said first beam is polarized when it emerges from the beam emitting device such that it will be reflected from said polarizing surface; and
said second beam is polarized when it emerges from the beam emitting device such that is will pass through said polarizing surface; and further including
an etalon having a vacuum chamber which is enclosed on a first side by a transparent plate and further is enclosed on a second side, said second side being opposed to said first side, by a mirrored plate with a mirrored surface of said mirrored plate facing said transparent plate, said transparent plate and said mirrored plate both being sufficiently larger than said vacuum chamber in at least one dimension such that a one of said beams can be passed through said transparent plate to said mirrored plate without going through said vacuum chamber, said etalon being positioned such that;

when said first beam is redirected by the right angle reflector such that said first beam is parallel to said measurement plane, said first beam passes through one of said quarter wave plates and then passes through said transparent plate and then strikes said mirrored plate, without passing through said vacuum chamber; and further such that when said first beam is redirected by the polarizing surface such that said first beam is parallel to said measurement plane, said first beam passes through one of said quarter wave plates and then passes through said transparent plate and then strikes said mirrored plate, without passing through said vacuum chamber; and further such that, when said first beam strikes said mirrored plate, it is reflected essentially directly back upon itself; and further when said second beam is emitted from the beam emitting device and then passes through the polarizing surface and then through one of said quarter wave plates, said second beam then passes through said transparent plate, then through said vacuum chamber, and then strikes said mirrored plate; and further when said second beam is redirected by the polarizing surface such that said second beam is parallel to said measurement plane, said second beam passes through one of said quarter wave plates, and then passes through said transparent plate, and then passes through said vacuum chamber, and then strikes said mirrored plate; and further such that, when said second beam strikes said mirrored plate, it is reflected essentially directly back upon itself.

13. The interferometer of claim 12, wherein:

variations in propagation time of said first beam as compared to said second beam are detected by comparison of said first beam and said second beam within a signal analysis apparatus.

* * * * *